(12) United States Patent
Kim et al.

(10) Patent No.: US 7,800,983 B2
(45) Date of Patent: Sep. 21, 2010

(54) METHOD AND APPARATUS TO RECORD DATA TO MINIMIZE A LAYER JUMP

(75) Inventors: Jae-hun Kim, Hwaseong-si (KR); Shuichi Tasaka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1021 days.

(21) Appl. No.: 11/529,368

(22) Filed: Sep. 29, 2006

(65) Prior Publication Data

US 2007/0242588 A1 Oct. 18, 2007

(30) Foreign Application Priority Data

Sep. 29, 2005 (KR) .................. 10-2005-0091495

(51) Int. Cl.
*G11B 21/08* (2006.01)
(52) U.S. Cl. .................. 369/30.15; 369/30.2
(58) Field of Classification Search ............. 369/30.15, 369/30.2, 275.3, 275.2, 275.4
See application file for complete search history.

(56) References Cited

U.S. PATENT DOCUMENTS

| | | | | |
|---|---|---|---|---|
| 6,075,760 A | * | 6/2000 | Tsutsui et al. | 369/30.2 |
| 2007/0201337 A1 | * | 8/2007 | Park | 369/30.2 |
| 2008/0049570 A1 | * | 2/2008 | Park et al. | 369/30.2 |

FOREIGN PATENT DOCUMENTS

| | | |
|---|---|---|
| JP | 2000-099955 | 4/2000 |
| JP | 2001-155349 | 6/2001 |
| JP | 2004-213784 | 7/2004 |

* cited by examiner

*Primary Examiner*—Tan X Dinh
(74) *Attorney, Agent, or Firm*—Stanzione & Kim LLP

(57) ABSTRACT

A data recording method to minimize a number of layer jumps, a recording/reproducing apparatus, and a recording medium thereof wherein a data area of the information storage medium is divided into units, each unit including one or more zones, and data is written on each of the zones along a data writing path in the unit selected with reference to information about the number of rewriting operations performed on each of the zones.

36 Claims, 15 Drawing Sheets

FIG. 7

| NUMBER OF RZONE | EACH RZONE CAPACITY [MB] | EACH RZONE RECORDING TIME AT 1x[sec] | EACH RZONE RECORDING TIME AT 2x[sec] | 2RZ UNIT JUMP CYCLE [time] | 3RZ UNIT JUMP CYCLE [time] | 5RZ UNIT JUMP CYCLE [time] | 2RZ UNIT L1 FINALIZE AT 2x[sec] | 3RZ UNIT L1 FINALIZE AT 2x[sec] | 5RZ UNIT L1 FINALIZE AT 2x[sec] |
|---|---|---|---|---|---|---|---|---|---|
| 1 | 8500 | 7200 | 3600 | 1 | | | | | |
| 3 | 2833 | 2400 | 1200 | 3 | 1 | | 3600 | | |
| 5 | 1700 | 1440 | 720 | 5 | 1 | 1 | 1200 | 1800 | 1800 |
| 10 | 850 | 720 | 360 | 9 | 3 | 1 | 720 | 1080 | 900 |
| 20 | 425 | 360 | 180 | 19 | 7 | 3 | 360 | 540 | 450 |
| 30 | 283 | 240 | 120 | 29 | 13 | 7 | 180 | 270 | 300 |
| 50 | 170 | 144 | 72 | 49 | 19 | 11 | 120 | 180 | 180 |
| 100 | 85 | 72 | 36 | 99 | 33 | 19 | 72 | 108 | 90 |
| | | | | | 67 | 39 | 36 | 54 | |

FIG. 11

| Sector number | RMD field | Structure | |
|---|---|---|---|
| | | Format4 | Additional New Format |
| 0 | Linking Loss Area | Linking Loss Area | Linking Loss Area |
| 1 | Field0 | Common information | Common information |
| 2 | Field1 | OPC related information | OPC related information |
| 3 | Field2 | User specific data | User specific data |
| 4 | Field3 | Boarder Zone information | Boarder Zone information |
| 5 | Field4 | RZone info #1 to #127 | DOW Counter of L0 |
| 6 | Field5 | RZone info #128 to #255 | DOW Counter of L1 |
| 7 | Field6 | RZone info #256 to #383 | |
| 8 | Field7 | RZone info #384 to #511 | |
| 9 | Field8 | RZone info #512 to #639 | |
| 10 | Field9 | RZone info #640 to #767 | |
| 11 | Field10 | RZone info #768 to #895 | |
| 12 | Field11 | RZone info #896 to #1023 | |
| 13 | Field12 | RZone info #1024 to #1151 | |
| 14 | Field13 | Drive Specific information | |
| 15 | Field14 | Disc Testing Area information | |

FIG. 12

| BP | Contents | Number of bytes |
|---|---|---|
| 0 to 1 | PCA Erase Counter | 2 |
| 2 to 3 | RZone #0 DOW Counter | 2 |
| 4 to 5 | RZone #1 DOW Counter | 2 |
| . . . | . . . | . |
| 2044 to 2045 | RZone #1021 DOW Counter | 2 |
| 2046 to 2047 | RZone # 1022 DOW Counter | 2 |

| Sector number | RMD field | Structure |
|---|---|---|
| | | Format4 |
| 0 | Linking Loss Area | Linking Loss Area |
| 1 | Field0 | Common information |
| 2 | Field1 | OPC related information |
| 3 | Field2 | User specific data |
| 4 | Field3 | Boarder Zone information |
| 5 | Field4 | RZone info #1 to #127 |
| 6 | Field5 | RZone info #128 to #255 |
| 7 | Field6 | RZone info #256 to #383 |
| 8 | Field7 | RZone info #384 to #511 |
| 9 | Field8 | RZone info #512 to #639 |
| 10 | Field9 | RZone info #640 to #767 |
| 11 | Field10 | RZone info #768 to #895 |
| 12 | Field11 | RZone info #896 to #1023 |
| 13 | Field12 | RZone info #1024 to #1151 |
| 14 | Field13 | DOW counter of L0 |
| 15 | Field14 | DOW counter of L1 |

FIG. 14

Rzone info.

| Byte Position | Contents | Number of bytes |
|---|---|---|
| ⋮ | ⋮ | ⋮ |
| 36 to 37 | Jump Interval | 4 |
| 38 to 47 | reserved | 10 |
| 48 to 51 | Start Sector number of RZone #1 | 4 |
| 52 to 55 | Layer Jump Address of RZone #1 | 4 |
| 56 to 59 | End Sector number of RZone #1 | 4 |
| 60 to 63 | Last Recorded Address of RZone #1 | 4 |
| 64 to 67 | Start Sector number of RZone #2 | 4 |
| 68 to 71 | Layer Jump Address of RZone #2 | 4 |
| 72 to 75 | End Sector number of RZone #2 | 4 |
| 76 to 79 | Last Recorded Address of RZone #2 | 4 |
| ⋮ | ⋮ | ⋮ |
| 2032 to 2035 | Start Sector number of RZone #125 | 4 |
| 2036 to 2039 | Layer Jump Address of RZone #125 | 4 |
| 2040 to 2043 | End Sector number of RZone #125 | 4 |
| 2044 to 2047 | Last Recorded Address of RZone #125 | 4 |

METHOD AND APPARATUS TO RECORD DATA TO MINIMIZE A LAYER JUMP

CROSS-REFERENCE TO RELATED APPLICATION

This application claims the benefit of Korean Patent Application No. 2005-91495, filed on Sep. 29, 2005, in the Korean Intellectual Property Office, the disclosure of which is incorporated herein by reference.

BACKGROUND OF THE INVENTION

1. Field of the Invention

Aspects of the present invention relate to a data recording method, and more particularly, to a data recording method to minimize the number of layer jumps, a recording/reproducing apparatus, and recording medium thereof.

2. Description of the Related Art

Among recording methods of rewritable optical information storage media, an automatic layer jump recording method is well known to produce the best recording/reproducing results. Therefore, a regular jump mode is, for example, widely used for a portable camcorder using the automatic layer jump recording method.

FIG. 1 is a view of a conventional automatic layer jump recording method when a data area of rewritable optical information storage medium is secure.

Referring to FIG. 1, the data recording is performed on a unit of an R zone on an information storage medium 100 having a dual-layer structure according to the automatic layer jump recording method. The R zone is a recordable area of the information storage medium 100. That is, the data recording is initiated in L0 130 of R zone #1, L1 140 of the R zone #1, L0 150 of R zone #2, L1 160 of the R zone #2, L0 170 of R zone #3, and then L1 180 of the R zone #3, in sequence.

FIG. 2 is a view illustrating frequent layer jumps during recording according to a rewriting quality deterioration of the information storage medium 100 in FIG. 1.

In a conventional recording method without considering a recording status of a rewriting medium, unnecessary layer jumps are performed in a layer jump interval. Then, the data recording is initiated in the R zone as illustrated in FIG. 1.

Accordingly, as illustrated in FIG. 2, when the L0 130 of the R zone #1 and the L0 150 of the R zone #2 are physically defective (e.g., quality deterioration of surface characteristics occurs after rewriting repeatedly), unnecessary and ineffective layer jumps such as ①②③④ are performed repeatedly. Since these layer jumps occur when recording real-time moving picture data, high-capacity memory is required to store a large amount of moving picture data that is not recorded during the layer jump. Additionally, power consumption increases due to unnecessary moving of a pickup of a recording/reproducing apparatus.

SUMMARY OF THE INVENTION

Aspects of the present invention provide a data recording method to minimize unnecessary layer jumps that cause physical defects and quality deterioration of an information storage medium after performing data rewriting repeatedly, a recording/reproducing apparatus, and the information storage medium thereof.

According to an aspect of the present invention, there is provided a method of recording data on an information storage medium, the method including: writing data on each zone of a plurality of zones along a data writing path in a unit of the information storage medium selected with reference to information about a number of rewriting operations performed on each of the zones wherein a user data area of the information storage medium includes units, each unit including one or more zones.

The writing of the data may, although not necessarily, include: managing information about the number of rewriting operations performed on each of the zones; checking the information about the number of rewriting operations performed on each of the zones; writing data on each of the zones when the number of rewriting operations performed on each of the zones does not exceed a predetermined threshold; and not writing data on each of the zones when the number of rewriting operations performed on each of the zones exceeds the predetermined threshold.

The unit may, although not necessarily, include the predetermined number of zones arranged on a first recording layer and a second recording layer of the information storage medium.

The method may, although not necessarily, further include determining a first zone and a second zone as a movement path between recording layers when both the number of rewriting operations performed on the first zone contained in the first recording layer and the number of rewriting operations performed on the second zone contained in the second recording layer that corresponds to the first zone, do not exceed the predetermined threshold.

The number of the zones included in the unit may, although not necessarily, be determined on the basis of at least one of a total recording capacity of the information storage medium, a number of movements between layers, a recording time, and a finalizing time of the information storage medium.

The zone may, although not necessarily, be an R zone including a portion of the first recording layer and a portion of the second recording layer that corresponds to the first recording layer, and the number of the R zones included in the unit is determined to be about one tenth of the total number of the R zones included in the information storage medium.

The zone may, although not necessarily, be an R zone including a portion of the first recording layer and a portion of the second recording layer that corresponds to the first recording layer, and the number of R zones included in the unit if three, four, or five R zones.

The information about the number of rewriting operations performed on each of the zones may, although not necessarily, be recorded on a Recording Management Area (RMA).

The information about the number of rewriting operations performed on each of the zones may, although not necessarily, be inserted as a field substituting for an existing recording management data (RMD) field or added as a new RMD field of the RMA.

According to another aspect of the present invention, there is provided a method of writing data on an information storage medium wherein a data area of the medium includes units, each unit including one or more R zones, the method including: managing information about the number of rewriting operations performed on each of the R zones, wherein each of the R zones includes an R zone in an upper recording layer and an R zone in a lower recording layer; and determining a movement path between layers within the unit, to write data on each of the R zones, such that movements between the upper recording layer and the lower recording layer are minimized with reference to the number of rewriting operations performed on each of the R zones.

According to another aspect of the present invention, there is provided an apparatus to record and/or reproduce data to and/or from an information storage medium, the apparatus including: writing/reading unit to write and/or read data to and/or from the information storage medium; and controller controlling the writing/reading unit to record data on the zone along a data recording movement path in a unit determined with reference to the number of times of rewriting operations for each of the zones.

According to another aspect of the present invention, there is provided an apparatus to record/reproduce data to/from an information storage medium wherein a data area of the information storage medium includes units, each unit including one or more R zones, each of the R zones including an R zone in an upper recording layer and an R zone in a lower recording layer, the apparatus including: a writing/reading unit to write/read data to/from the information storage medium; and a controller managing information about the number of rewriting operations performed on each of the R zones, and controlling the writing/reading unit to determine a movement path between layers within the unit, to write data on each of the R zones, such that movements between the upper recording layer and the lower recording layer are minimized with reference to the number of rewriting operations performed on each of the R zones.

According to yet another aspect of the present invention, there is provided an information storage medium including: a first area divided into units, each unit including one or more zones; and a second area on which information about the number of rewriting operations performed on each of the zones is recorded, wherein a movement path along which data is to be written is determined within the unit in the first area with reference to the information about the number of rewriting operations performed on each of the zones recorded on the second area.

According to another aspect of the present invention, there is provided an information storage medium including: a data area divided into units, each unit including one or more R zones for data recording, each of the R zones including an R zone in an upper recording layer and an R zone in a lower recording layer; and an RMA on which information about the number of rewriting operations for each of the R zones is recorded, wherein data is recorded on each of the R zones along a movement path between layers within the unit determined such that movements between the upper recording layer and the lower recording layer are minimized with reference to the number of rewriting operations performed on each of the R zones.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a table illustrating specific data used in FIG. 6;

FIG. 11 is a table illustrating one example of an RMD in which DOW counter information about each R zone is stored according to an embodiment of the present invention;

FIG. 12 is a table illustrating a DOW counter information field of L0 or L1 in FIG. 11;

FIG. 13 is a table illustrating another example of an RMD in which DOW counter information about each R zone is stored according to another embodiment of the present invention;

FIG. 14 is a table illustrating contents of an R zone information field in FIG. 11 or FIG. 13.

DETAILED DESCRIPTION OF THE EMBODIMENTS

Figure 1:
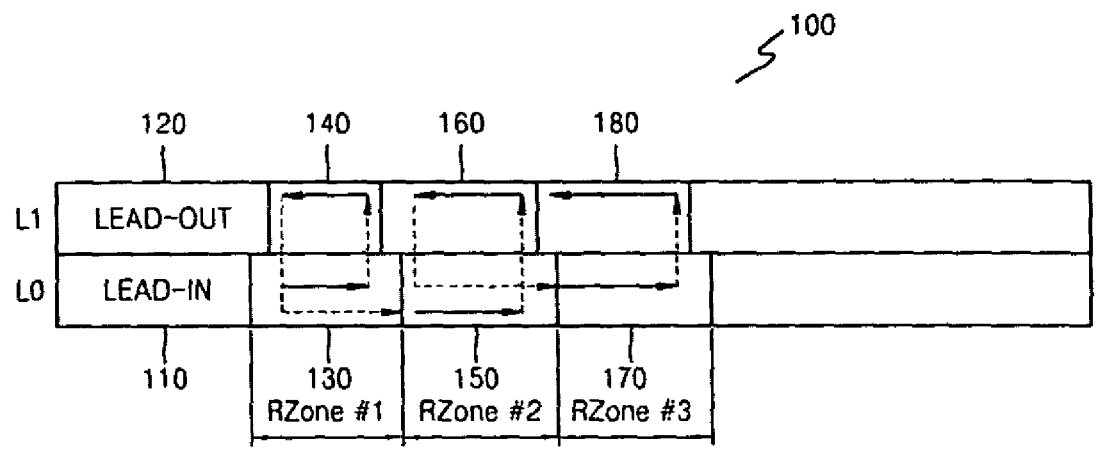
FIG. 1 is a view of a conventional automatic layer jump recording method.
Figure 2:
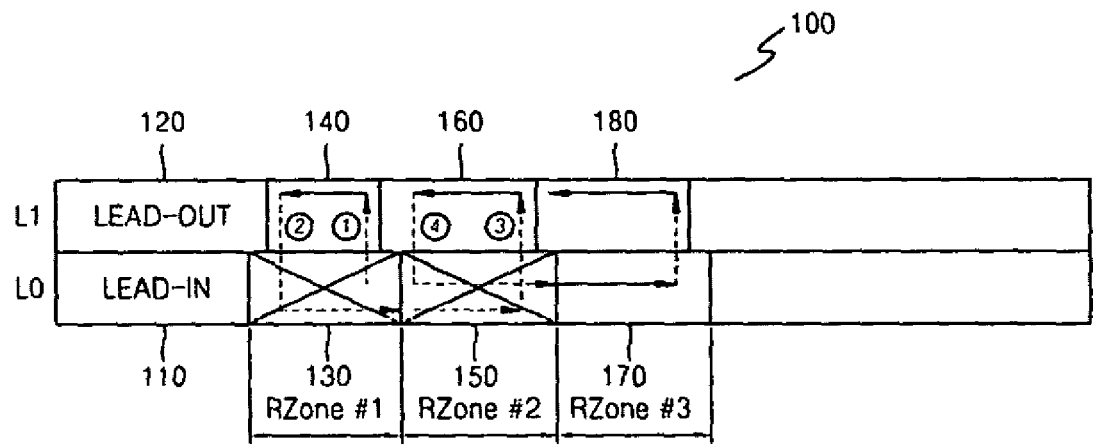
FIG. 2 is a view illustrating frequent layer jumps during recording according to a rewriting quality deterioration of an information storage medium in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
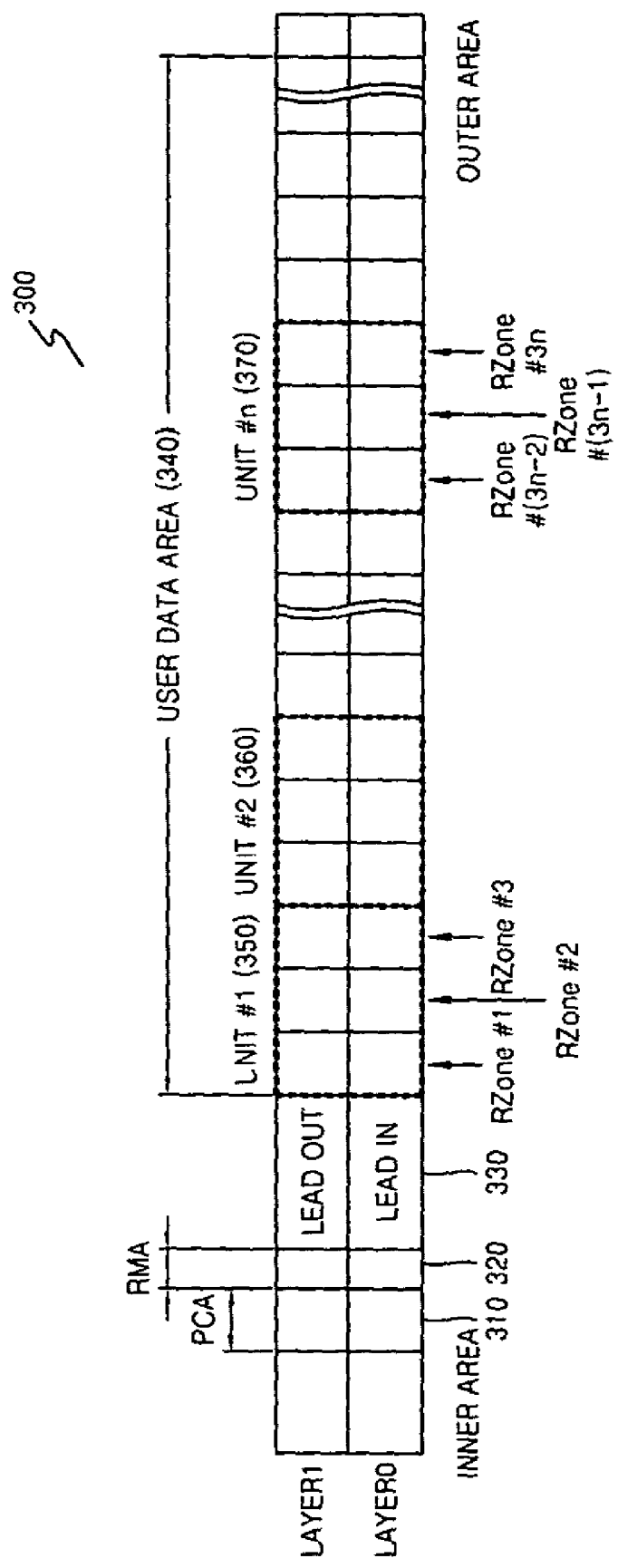
FIG. 3 is a view illustrating a structure of an information storage medium applied with a layer jumps recording method according to an embodiment of the present invention.

FIG. 3 is a view illustrating a structure of an information storage medium 300 to which a layer jumps recording method according to an embodiment of the present invention is applied.

Referring to FIG. 3, the information storage medium 300 is a dual-layer structure with a layer 0 and a layer 1 and includes a power calibration area (PCA) 310, a recording management area (RMA) 320, a lead-in/lead-out area 330, and a user data area 340.

The PCA 310 is an area to control an optimized power to record data on the information storage media 300.

The RMA 320 is an area to record information to manage data recorded on the information storage medium 300. Particularly, the RMA 320 records information about the number of rewriting operations performed on the R zones arranged in the user data area 340. The rewriting operation is a recording operation performed on the information storage medium 300 capable of multiple recording operations performed thereon. Additionally, information about the number of rewriting operations performed on the PCA 310 may, although not necessarily, be recorded in the RMA 320. For example, when the number of rewriting operations performed on the user data area 340 and the PCA 310 is managed on a memory of a system, the last updated number of the rewriting operations is recorded in the RMA 320 as soon as recording operations performed on the user data area 340 and the PCA 310 are terminated.

A lead-in area and a lead-out area in the lead-in/lead-out area 330 are arranged on the layer 0 and the layer 1, respectively.

The user data area 340 is an area to record a user data and includes at least one R zone included in a unit. As illustrated in FIG. 3, according to an aspect of the present invention, each unit may, although not necessarily, be configured with three R zones. Referring to FIG. 3, unit # 1 350 is configured with R zone # 1, R zone # 2, and R zone # 3, and unit # n 370 is configured with R zone # (3n−2), R zone # (3n−1), and R zone # 3n. Additionally, each R zone is configured with the layer 0 and the layer 1.

A recordable area of the user data is called the R zone, and one logic unit may, although not necessarily, be defined by three R zones including the R zone # 1 of FIG. 3 located along an outer circumference. Accordingly, a first R zone of the $n_{th}$ unit of an inner circumference is (3n−2), a middle R zone is (3n−2), and a last R zone of the outer circumference is 3n. Therefore, the unit corresponding to the R zone to be recorded on can be located.

The invention should not be construed as being limited to the embodiments set forth herein. The number of R zones that can be included in the one unit can be determined by various methods, and the description thereof will be described.

The data area is divided into units, each unit having a plurality of zones, such as the three R zones per unit in the embodiment of the present invention illustrated in FIG. 3). After recording of one unit is completed, the next unit is recorded in a data recording process. Additionally, a data recording process for each unit includes assessing information about the number of rewriting operations performed on each R zone in that unit and determines a movement path between layers such that the jumps between the layer 0 and the layer 1 are minimized. The data is recorded in each R zone along the movement path. That is, the information about the number of rewriting operations for each R zone is checked before recording data in that R zone. If the number of rewriting operations exceeds a predetermined threshold, an attempt to record the data in the R zone is not made, and the data is recorded in the next recordable R zone that has a shortest movement path between layers.

Figure 4:
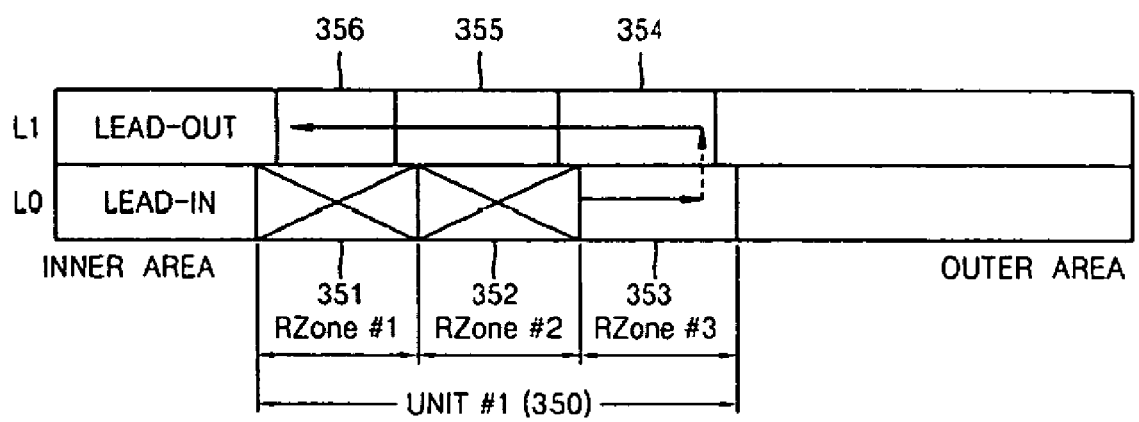
FIG. 4 is a detailed view illustrating a unit #1 of FIG. 3 and explaining a method to minimize layer jumps by managing the number of rewritings according to an embodiment of the present invention.

FIG. 4 is a detailed view illustrating unit #1 350 of FIG. 3 and explaining a method to minimize layer jumps by managing the number of rewriting operations according to an embodiment of the present invention.

Referring to FIG. 4, unit # 1 350 is configured with R zone #1, R zone # 2, and R zone # 3, and each R zone is configured with a lower recording layer L0 and an upper recording layer L1. That is, the R zone # 1 is configured with a lower recording layer 351 and an upper recording layer 356, the R zone # 2 is configured with a lower recording layer 352 and an upper recording layer 355, and the R zone # 3 is configured with a lower recording layer 353 and an upper recording layer 354.

In this structure, when information about the number of rewriting operations performed on each R zone is managed, whether the number of performed rewriting operations exceeds a threshold number can be determined. For example, as illustrated in FIG. 4, in advance of the data recording process, whether the number of rewriting operations performed on the lower recording layer of the R zone #1 351 and the number of rewriting operations performed on the lower recording layer of the R zone #2 (352) exceed the threshold number can be determined. Although the upper recording layer L1 of the R zone and the lower recording layer L0 of the R zone are included in one R zone, the information about the number of rewriting operations performed on each layer may be managed. Accordingly, the number of movements between layers can be minimized when determining a movement path starting from the lower recording layer of the R zone # 3 353 and proceeding to the upper recording layer of the R zone # 3 355 without attempting to record data in the lower recording layer of the R zone # 1 351 and the lower recording layer of the R zone # 2 352 that exceed the threshold number of rewriting operations.

Figure 5:
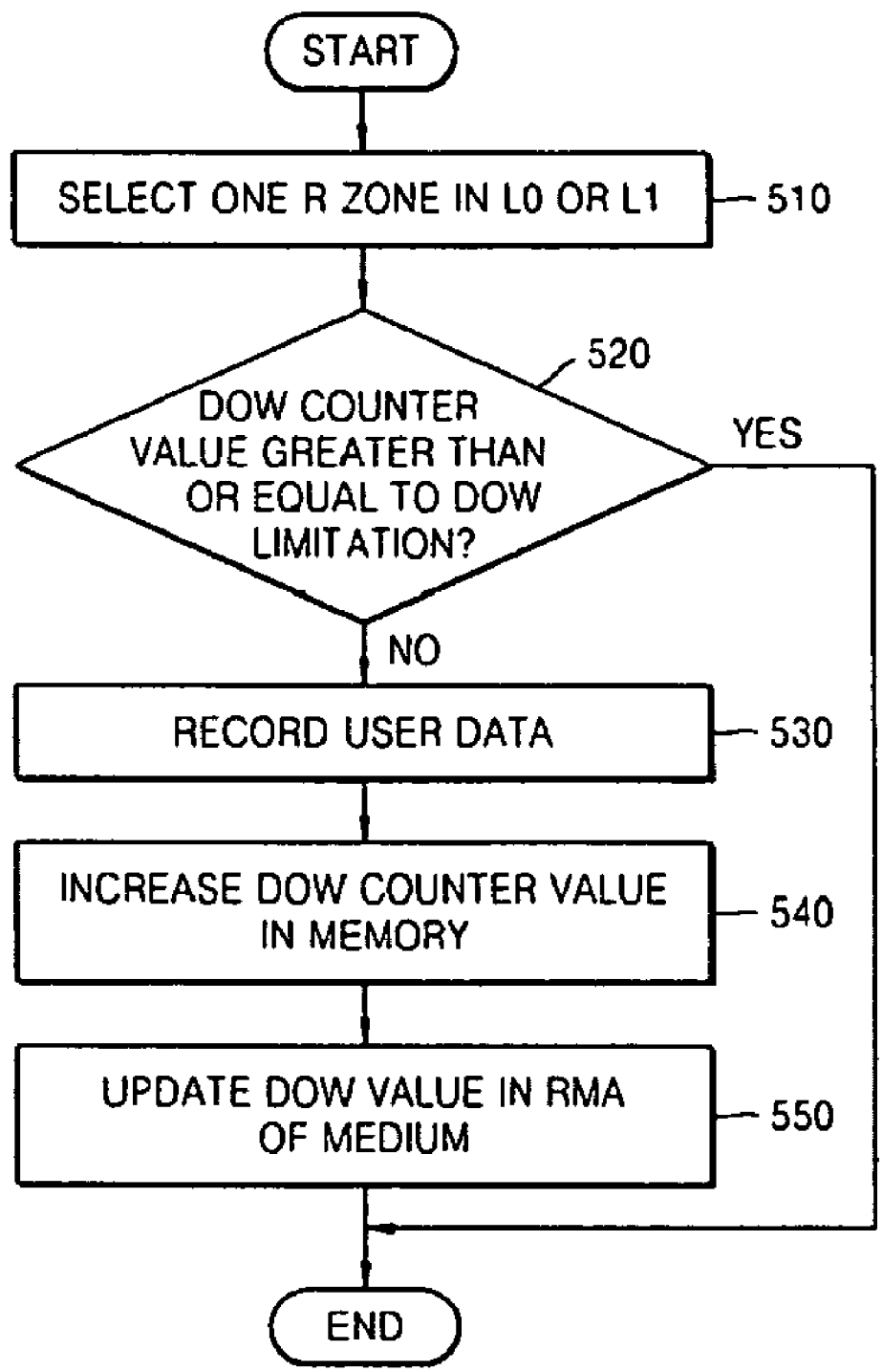
FIG. 5 is a flowchart illustrating a method to record data using a DOW counter at each R zone according to an embodiment of the present invention.

FIG. 5 is a flowchart illustrating a method to record data using a DOW (Direct Over Write) counter at each R zone according to an embodiment of the present invention, Referring to FIG. 5, one R zone is selected to record data on the layer 0 or the layer 1 of the information storage medium 300 in operation S510.

It is determined whether a value of the DOW counter for the selected R zone is greater than a DOW threshold value in operation S520. The DOW counter counts the number of rewriting operations performed on each R zone. For example, the DOW counter is increased by one each time the data is recorded in the R zone. Degradation characteristics can, although not necessarily, be allowable for up to 1000 times of data recording in DVD-RW, +RW, etc, and 100,000 times of data recording in DVD-RAM. However, it is understood that different threshold values can be assigned to these types of media, and the present invention is not limited to the present embodiment. Thus, the DOW threshold can vary according to the rewritable disk. For example, according to an aspect of the invention, the R zone (an upper layer or a lower layer) with over 1000 performed rewriting operations can not be accessed in a DVD-RW dual layer.

When the DOW counter value is larger than or equal to the DOW threshold, data is not recorded on the selected R zone and the recording operation for the selected R zone is terminated because the number of recording operations on the selected R zone already exceeds the DOW threshold. Thus, recording further data will be unreliable.

When the DOW counter value is less than the DOW threshold, data is recorded on the selected R zone because the number of recording operations on the selected R zone does not exceed the DOW threshold, and thus the data can be recorded reliably in operation S530.

Then, the DOW counter value, which is stored in a memory, is increased in operation S540.

Next, when the data recording is terminated, the DOW counter value of the selected R zone is updated by recording a final DOW counter value, which is stored in a memory, on the RMA 320 of the information storage medium 300 in operation S550. Although the RMA 320 is updated with the DOW counter value of one R zone after recording one R zone in FIG. 5, the recording of a plurality of R zones is usually performed and a plurality of DOW values corresponding to the plurality of R zones is updated in the RMA 320.

Whether the number of rewriting operations performed on the R zone exceeds the threshold value for the number of rewriting operations (i.e., the DOW threshold) is determined by managing the information about the number of rewriting operations performed on each R zone and referring to the information of the number of rewriting operations performed on the R zone before recording the data. Therefore, when the number of performed rewriting operations exceeds the threshold value, the unreliable recording of the data can be prevented by avoiding the data recording on the R zone.

The number of R zones included in one unit 350, 360, 370 is determined to reduce the number of movements between layers in the R zone and optimize the recording of the data. Factors in optimizing the recording of the data include performing the data recording with a minimum of the layer jumps in each unit 350, 360, 370 and minimizing a required finalizing time to finalize the information storage medium 300. The number of R zones included in one unit 350, 360, 370 is determined on the basis of these factors.

Figure 6:
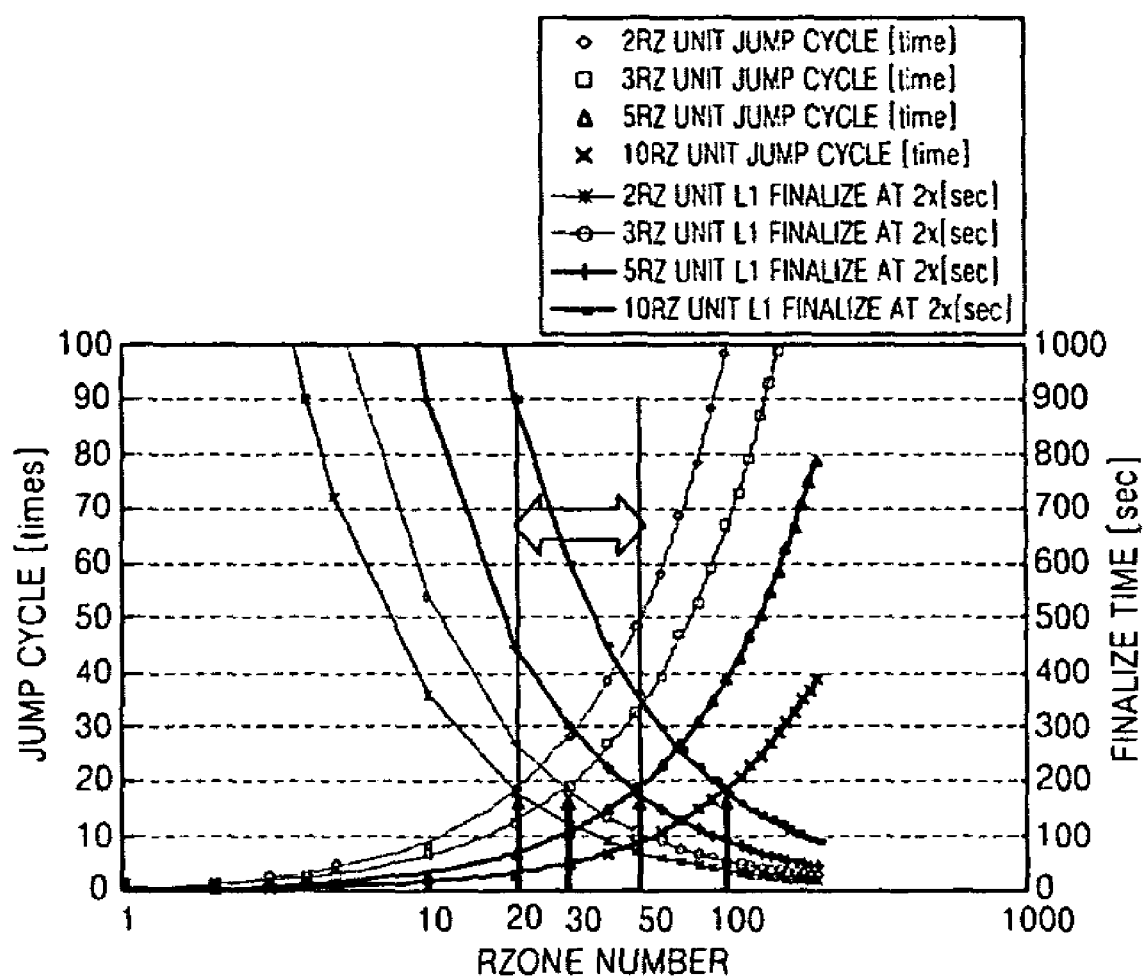
FIG. 6 is a graph illustrating how the number of R zones included in one unit is determined according to an embodiment of the present invention.

FIG. 6 is a graph illustrating how the number of R zones included in one unit is determined according to an embodiment of the present invention.

FIG. 7 is a table illustrating specific data used in FIG. 6;

The table of FIG. 7 represents a jump cycle and the finalizing time of the recording operation when each one unit includes two R zones, three R zones, or five R zones in eight example information storage media 300. Each row of the table represents each of the eight information storage media 300. The columns are as followings:

First column: the total number of R zones included in the information storage media 300;

Second column: each R zone capacity;

Third column: each R zone recording time at 1×;

Fourth column: each R zone recording time at 2×;

Fifth column: number of jump cycles in one unit with two R zones;

Sixth column: number jump cycles in one unit with three R zones;

Seventh column: number of jump cycles in one unit with five R zones;

Eighth column: finalizing time in L1 of one unit with two R zones;

Ninth column: finalizing time in L1 of one unit with three R zones; and

Tenth column: finalizing time in L1 of one unit with five R zones.

Here, the finalizing time in L1 is a required time to finalize the information storage medium 300 when the data recording operation is completed in a worst-case scenario requiring the most time. For example, referring to FIG. 7, when finalizing the information storage medium 300 after the data recording operation is completed in a lower layer of R zone # 1 and a lower layer of R zone #2, included in one unit with three R zones, a portion, which needs to be filled with data to finalize the information storage medium 300, is filled with padding data in an upper layer of R zone # 1 and an upper layer of R zone #2 because data needs to be recorded in both a lower layer and an upper layer. Additionally, more padding data is filled in a portion of R zone #3 to indicate the termination of the data recording operation. At this point, the finalizing time indicates a required time to record the padding data.

The graph of FIG. 6, based on the specific data of FIG. 7, will now be described.

The graph of FIG. 6 illustrates an optimized recording of the data with the number of jump cycles, the number of R zones, and the finalizing time as variables. The number of layer jumps and the finalizing time has a trade-off relationship, so that when the number of layer jumps decreases, efficiency is increased but the finalizing time is also increased.

According to an aspect of the present invention, referring to FIG. 6, the optimized recording of the data may, although not necessarily, be achieved with under 19 layer jumps and 180 seconds of the finalizing time. It is understood, however, that the optimized recording of the data is not a limiting aspect of the present invention, and the information storage medium 300 may be configured with any number of units and R zones per unit. In the present embodiment, there is provided a possible configuration of the information storage medium 300 to optimize efficiency having each unit with three to five R zones out of a total of 30 to 50 R zones, respectively, included in the information storage medium 300. That is, when one tenth of the total number of R zones of the information storage medium 300 is included in each unit of the information storage medium 300, the optimized efficiency may be achieved. It is to be understood, however, that this is just one example of optimization by considering the layer jumps and the finalizing time, and there are various methods to determine the number of the R zones included in each unit.

Figure 8A:
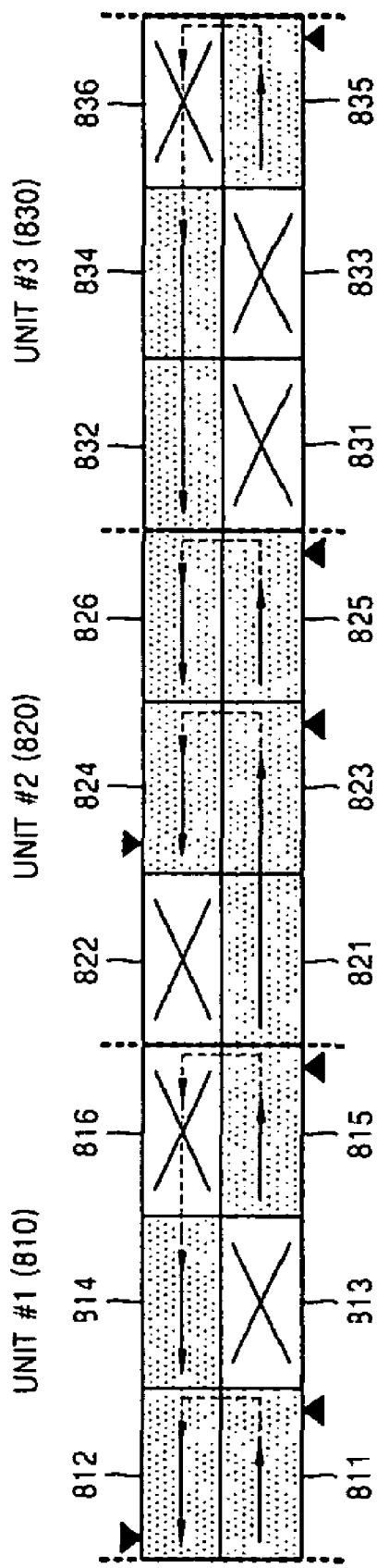
FIGS. 8A and 8B are views of a movement path in each unit when applying a recording method according to an embodiment of the present invention.
Figure 8B:
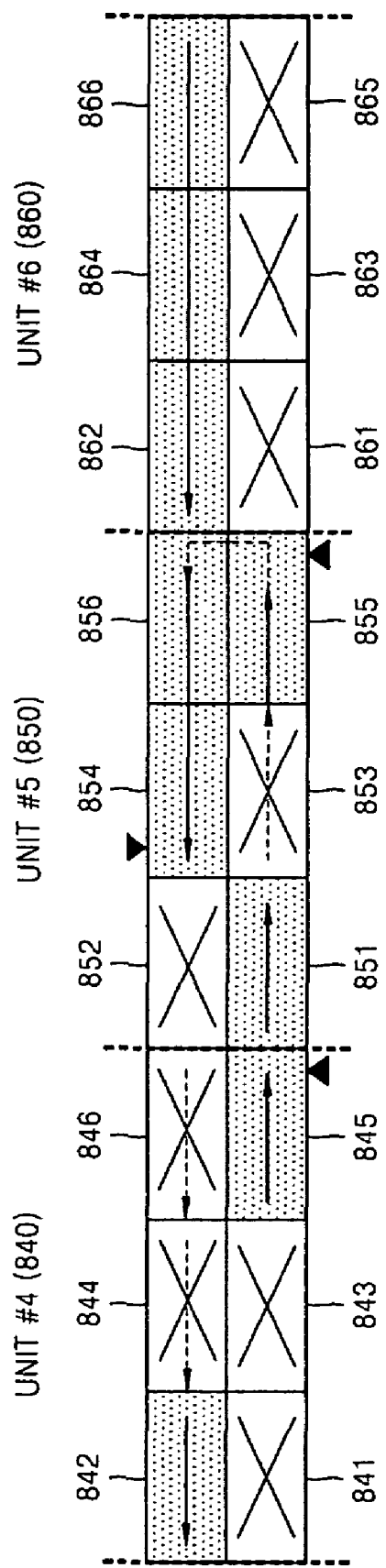

FIGS. 8A and 8B are views of a movement path in each unit when applying a recording method according to an embodiment of the present invention.

When each unit includes three R zones, a recording order of user data in one unit is illustrated in FIGS. 8A and 8B according to various situations. Each R zone includes a dual-layer structure of L0 and L1, and the various situations include unrecordable R zones, as illustrated, when exceeding the DOW threshold.

The recording method allowing a minimum number of layer jumps is considered in each unit and each R zone included in a unit by maintaining a recording order to preserve recording characteristics.

The recording order may, although not necessarily, provide that Layer 1 (L1) is recorded right after Layer 0 (L0) when DOW counter values of a lower recording layer L0 and an upper recording layer L1 are below a threshold. However, it is understood that this aspect is not limiting, and different recording orders in relation to the layers may be used to minimize layer jumps according to the recording method.

A starting point of each recording is based on an incremental recording method continuing from a previously recorded area, and a unit range where the corresponding R zone belongs is identified by order of each corresponding R zone according to a position of the starting point. As illustrated in FIGS. 8A and 8B, solid lines and dotted lines represent a recording path and a path passing through without recording, respectively. ▲▼ represent a point where a layer jump occurs in one unit. Additionally, an arrow represents a movement path of an optical source.

Referring to FIG. 8A, in a case of a UNIT # 1 810, L1 812 of an inner circumference R zone is recorded after L0 811 of the inner circumference R zone when the L1 812 of the R zone is verified as recordable (i.e., the number of recording operations performed on the R zone, or the DOW counter value, does not exceed the threshold value) and the L0 813 of a middle R zone is verified as not recordable (i.e., the number of recording operations performed on the R zone, or the DOW counter value, exceeds the threshold value). L1 816 of an outer circumference R zone is verified after verifying L0 815 of the outer circumference R zone and then, when verified as recordable, as illustrated in FIG. 8A, recording the data on the L0 815 of the outer circumference R zone. Since L1 816 of the outer circumference R zone is not recordable, the remaining L1 814 of the middle R zone is recorded from the outer circumference to the inner circumference.

In a case of a UNIT # 2 820, after verifying and recording the data on L0 821 of the inner circumference R zone, since L1 822 of the inner circumference R zone is not recordable, a recordable L0 of the next R zone (L0 823 of the middle R zone) is recorded. Next, L1 824 of the middle R zone is verified as recordable and recorded on, and then recording of L0 825 and L1 826 of the remaining outer circumference R zone is finalized.

In a case of a UNIT # 3 830, since L0 831 of the inner circumference R zone and L0 833 of the middle R zone are not recordable, L0 835 of the outer circumference R zone is recorded on. Next, L1 836 of the outer circumference R zone is verified as not recordable, so L1 834 of the middle R zone and L1 832 of the inner circumference R zone are recorded on in that order.

In a case of a UNIT # 4 840, after L0 841 of the inner circumference R zone and L0 843 of the middle R zone are verified as not recordable, L0 845 of the outer circumference R zone is recorded on first. Next, after L1 846 of the outer circumference R zone and L1 844 of the middle R zone are verified as not recordable, L1 842 of the inner circumference R zone is recorded after a layer jump, as shown.

In a case of a UNIT # 5 850, recording is initiated in L0 851 of the inner circumference R zone. After, L1 852 of the inner circumference R zone and L0 853 of the middle R zone are verified as not recordable, L0 855 of the outer circumference R zone is recorded on. Next, after a layer jump, as shown, L1 856 of the outer circumference R zone and L1 854 of the middle R zone are recorded on, in that order.

In a case of a UNIT #6 860, all L0s 861, 863 and 865 of the R zones are not recordable. Therefore, the remaining recordable L1 866, 864 and 862 of the R zones are recorded from the outer circumference R zone to the inner circumference R zone, as shown.

Figure 9A:
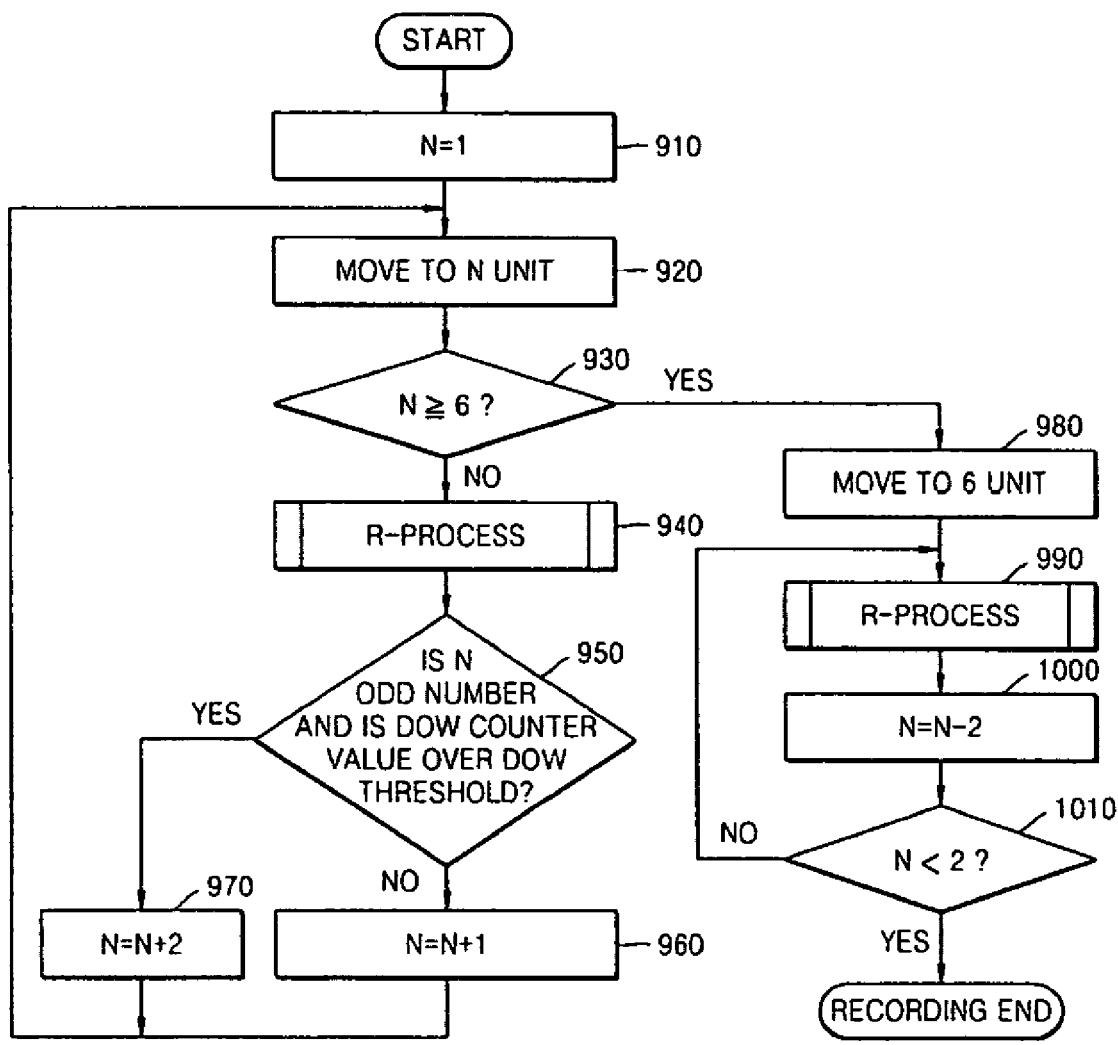
FIGS. 9A and 9B are flowcharts illustrating a method to record data according to a movement path that minimizes movements between layers in one unit using DOW characteristics of each R zone in a case of one unit with three R zones according to an embodiment of the present invention.
Figure 9B:
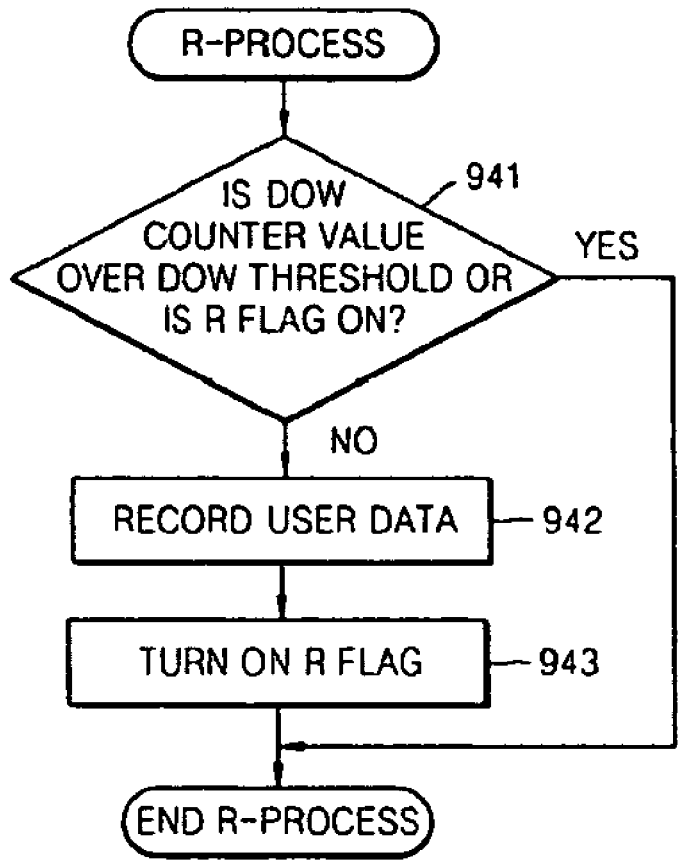

FIGS. 9A and 9B are flowcharts illustrating a method to record data according to a movement path that minimizes movements between layers (i.e., layer jumps) in one unit using DOW characteristics of each layer of each R zone in a case of one unit with three R zones according to an embodiment of the present invention. However, it is understood that the method may be used on any configuration of a number of R zones in each unit, and is not limited to the configuration of three R zones per unit.

Referring to FIG. 9A, the recording method is initiated at L0 of the inner circumference R zone using a virtual variable N and N is initialized to 1 in operation 910.

Figure 10:
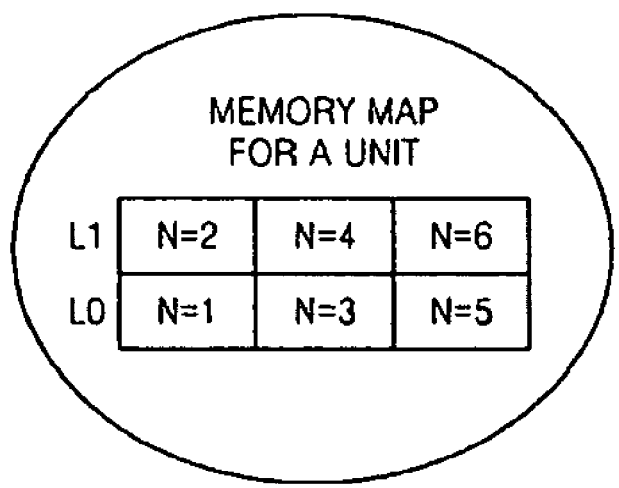
FIG. 10 is a view illustrating a memory map configuration for each unit used in FIGS. 9A and 9B.

Next, a pickup is moved to an N area of a memory map in operation 920. A configuration of the memory map for the unit is illustrated in FIG. 10. One unit includes dual-layers of L0 and L1. The inner circumference R zone corresponds to the N area of N=1 and N=2, the middle R zone corresponds to the N area of N=3 and N=4, and the outer circumference R zone corresponds to the N area of N=5 and N=6. According to an aspect of the invention, odd-numbered values of N correspond to the layer of L0 and even-numbered values of N correspond to the layer of L1.

Next, it is checked whether N is equal to 6 (corresponding to L1 of the outer circumference R zone) or greater than 6 (corresponding to a next unit) in operation 930.

When N is not equal to 6 (does not correspond to L1 of the outer circumference R zone in a corresponding unit) or greater than 6 (does not correspond to the next unit), an R-process is performed in operation 940. The R-process is described with reference to FIG. 9B.

Referring to FIG. 9B, in operation 941, it is checked whether the DOW counter value of the layer of the R zone, corresponding to the N area, is greater than the threshold value or whether there is a recording completed status already in the R-process.

Whether the layer of the R zone, corresponding to the N area, has the recording completed status can be verified by checking whether an R flag of the layer of the R zone is on or not. The R flag is turned on when the recording operation is completed. The R flag is a flag representing whether the corresponding N area is a recordable N area for the recording order.

After verification, when the R flag is not on and the DOW counter value does not exceed the DOW threshold value, user data is recorded in the corresponding layer of the corresponding R zone by physically moving (including the layer jump, if necessary) a pickup optical source in operation 942. Then, the R-process is terminated after recording the data and turning on the R flag in operation 943.

After verification, when the R flag is on and/or the DOW counter value exceeds the DOW threshold value, the R-process is terminated to prevent the unreliable recording.

After completing the R process in operation 940, as described in FIG. 9B, it is determined whether N is an odd number and the DOW counter value exceeds the DOW threshold in operation 959. When N is an odd number and the DOW counter value exceeds the DOW threshold, the corresponding R zone is in L0 and the rewrite cannot be performed.

When N is an odd number and the DOW counter value exceeds the DOW threshold, N is increased by two in operation 970 and a pickup is moved to the layer of the R zone corresponding to the new N area in operation 920. That is, when the R zone in L0, corresponding to the N area, exceeds the threshold value of the number of rewriting operations, the pickup is moved to the adjacent R zone of L0 corresponding to a new N area, after the value of N is increased by two.

With the exception where N is an odd number and the DOW counter value exceeds the DOW threshold, N is increased by 1 in operation 960 and a pickup is moved to the layer of the R zone corresponding to the new N area in operation 920. That is, when the N area corresponds to the L1 of the R zone or the N area corresponds to the L0 of the R zone and the DOW counter value is less than the threshold value of the number of rewriting operations, N is increased by one and a pickup is moved to the layer of the R zone corresponding to the new N area.

That is, when the N area corresponds to the L0 of the R zone and the DOW counter value exceeds the threshold value of the number of rewriting operations, the pickup is moved to an adjacent R zone in the same recording layer L0; and in other cases, the pickup is moved to or moved within (from L0 to L1) the R zone according to a sequentially increasing order.

After the checking in the operation 930, when N exceeds 6 (i.e. the N area corresponds to L1 of the outer circumference R zone), the pickup is moved to the area corresponding to N=6 in operation 980 and the R-process is performed in operation 990. The R-process of operation 990 is identical to the previous R-process of the operation 940.

After performing the R-process of operation 990, N is increased by two in operation 1000, after which it is determined whether N is less than two in operation 1010. N is decreased by two to move from the N area corresponding to the L1 of the outer circumference R zone to the N area corresponding to the L1 of the middle R zone.

When N is not less than two, the R-process is performed again in operation 990, and when N is less than two, the L1 of the R zone of the corresponding unit is recorded completely, and the recording of the corresponding unit is terminated.

FIG. 11 is a table illustrating one example of a recording management data (RMD) 1100 in which the DOW counter information about each layer of each R zone is stored according to an embodiment of the present invention. The RMD is data that is recorded in the RMA 320 of the information storage medium 300 illustrated in FIG. 3. According to the present invention, information about the number of rewriting operations performed on each R zone can be included in the RMD format.

Referring to FIG. 11, the RMD 1100 includes a conventional format4 RMD, DOW counter information 1120 and 1130 about each R zone, and the RMD 1110 with additional new format. The DOW counter information about each R zone includes DOW counter information 1120 about L0 and DOW counter information 1130 about L1. The DOW counter that counts the number of rewriting operations performed on each R zone is set for each recording layer, and the layers of the R zone having a degraded quality due to excessive rewriting are not recorded on. Consequently, a layer jump may be prevented.

FIG. 12 is a table illustrating the DOW counter information field 1120 and 1130 of L0 or L1 in FIG. 11.

Referring to FIG. 12, the DOW counter information field 1120 and 1130 includes the R zone where user data may be recorded and a PCA erase counter where a test recording is performed to set a recording power. DOW counter values for each R zone are recorded from the second byte of the DOW counter information field.

The DOW counters for layer 0 and layer 1 are separately allocated for each R zone determined according to a jump interval. The number of rewriting operations performed on each R zone is increased by one when data is recorded in the corresponding layer of the R zone and is stored in buffer memory temporarily. Then, the number of rewriting operations is updated and recorded in the RMA 320 of the information storage medium 300 as soon as recording of all user data is completed.

The DOW counter is increased after recording is completed even when a minimum amount of data is recorded on the corresponding layer of the corresponding R zone. This DOW counter value must be maintained after erasing or formatting the information storage medium 300 entirely. Additionally, an address of a sector of the last recorded layer of the last recorded R zone is a reference to locate a record starting point when for a next additional recording. At this point, when the next additional recording does not start at a first sector of the last recorded layer of the last recorded R zone, the corresponding DOW counter is not increased after recording thereon. The DOW counter value is increased after recording the first sector of the corresponding layer of the corresponding R zone. That is, the DOW counter value is increased by one until recording of all sectors of the corresponding layer of the corresponding R zone. The address of the last recorded sector in the layer of the R zone is recorded in a field with information about each R zone of the RMD 1100, as illustrated in FIG. 14.

FIG. 14 is a table illustrating contents of the R zone information field in FIG. 11 or FIG. 13.

Referring to FIG. 14, the user data area 340, in which automatic layer jump recording is performed, and managing information of the first sector and a final sector of each layer of each R zone in Format4 RMD 1100 is managed. Through this, the last recorded sector of each layer of each R zone and layer jumps point can be located accurately.

FIG. 13 is a table illustrating another example of the RMD 1100 in which DOW counter information for each layer of each R zone is stored according to an embodiment of the present invention.

As illustrated in FIG. 11, there is provided the additional new format 1110 containing DOW counter information separated from the conventional RMD format 1100. However, the RMD format 1300 of FIG. 13 contains the DOW counter information field in the conventional RMD format to be compatible with the conventional RMD format and does not include the additional new format 1110. Referring to FIG. 13, the RMD format includes the DOW counter information 1301 of L0 and the DOW counter information 1302 of L2 in field 13 and field 14, respectively.

The present invention abides by a recording order to achieve an efficient recording/reproducing quality, in terms of physical characteristics, of a multilayer optical recording medium. That is, when first recording on the medium or recording after erasing all data on the medium, the recording order where layer 0 is first recorded and then layer 1 is recorded is maintained when recording data on the R zone.

Figure 15:
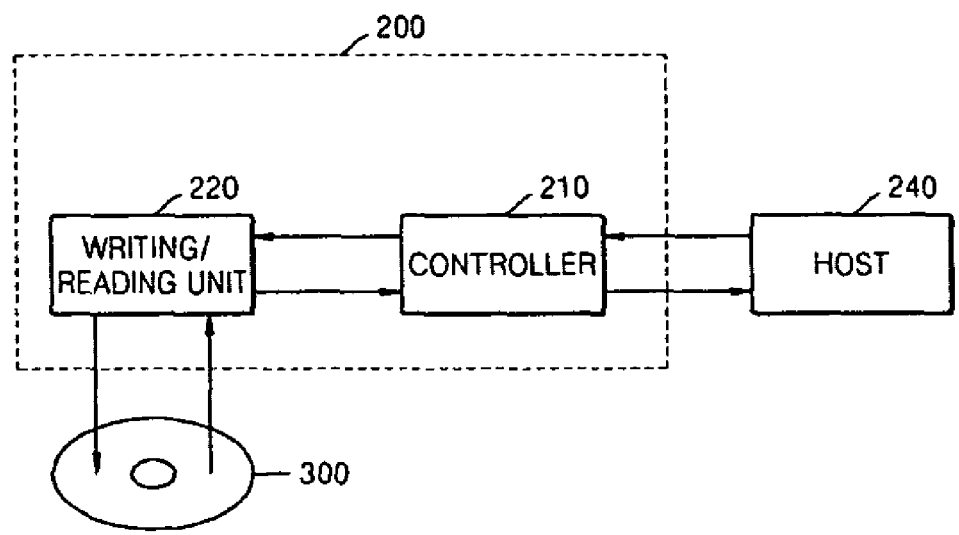
FIG. 15 is a block diagram of a recording/reproducing apparatus according to an embodiment of the present invention.

FIG. 15 is a block diagram of a recording/reproducing apparatus 200 according to an embodiment of the present invention.

Referring to FIG. 15, the recording/reproducing apparatus 200 to record and/or reproduce data includes a writing/reading unit 220 and a controller 210. The writing/reading unit 220 records data on the information storage medium 300 and reads data to reproduce recorded data according to a control of the controller 210. The controller 210 controls the writing/reading unit 220 to record data on the information storage medium 300, controls the writing/reading unit 220 to read data from the information storage medium 300, and/or obtains effective data by processing data read by the writing/reading unit 220 according to a command of a host 240.

In FIG. 15, although the host 240 is located outside the recording/reproducing apparatus 200, the present invention is not limited thereto, and the host can be arranged on an inside area of the recording/reproducing apparatus 200.

The controller 210 uses a user data area 340 where the user data area 340 is divided into units, each including one or more zones. The zone may be an R zone. The number of zones included in one unit is determined, as described above, considering a data recording capacity of the information storage medium 300, the total number of zones included in the information storage medium 300, or a command from the host 240.

Additionally, the controller 210 manages information about the number of rewriting operations performed on each zone, or each layer of each zone. When the number of rewriting operations performed the zone exceeds a threshold value of the number of rewriting operations, an attempt to record data on a next zone is made without attempting to record data on the zone. Consequently, safe and reliable data recording can be achieved by preventing data from being recorded on the zone having performed a number of rewriting operations greater than a threshold value of the number of rewriting operations.

Additionally, the controller 210 manages information about the number of rewriting operations for each zone and then determines a movement path to minimize jumps between an upper recording layer and a lower recording layer. Consequently, overload or excessive power consumption due to unnecessary jumps between layers can be reduced. Referring to information about the number of rewriting operations for a zone, one method of determining a path for layer jumps is to perform the jump only when the lower recording layer and the upper recording layer of the zone are recordable, and in other cases, a pickup is moved to the next zone adjacent to the lower recording layer without moving from the lower recording layer to the upper recording layer. This is described above with reference to FIGS. 8A, 8B, 9A, and 9B.

Figure 16:
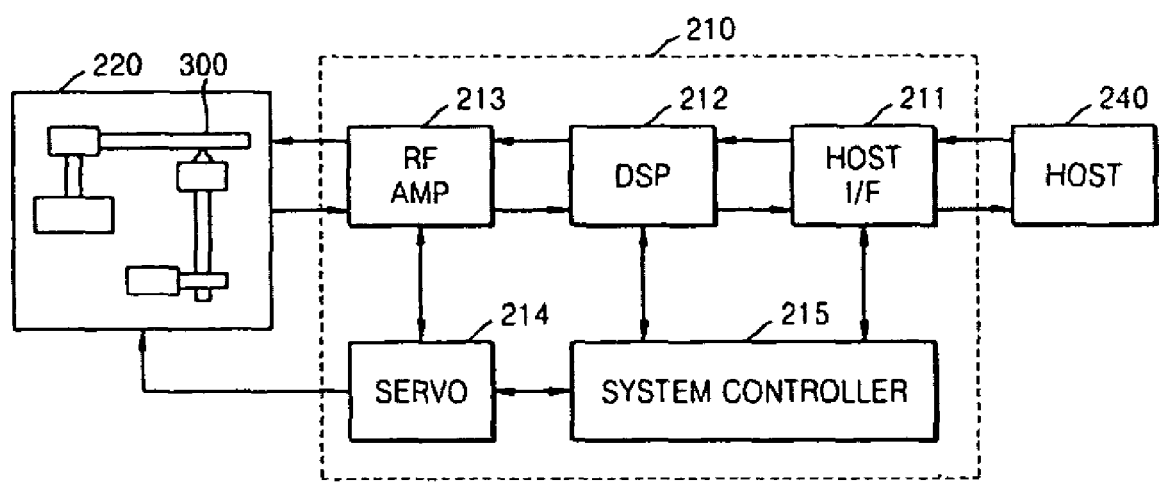
FIG. 16 is a detailed block diagram of a recording/reproducing apparatus in FIG. 15.

FIG. 16 is a detailed block diagram of the recording/reproducing apparatus 200 illustrated in FIG. 15.

Referring to FIG. 16, the writing/reading unit 220 includes a pickup in the recording/reproducing apparatus 200. The information storage medium 300 is mounted on the pickup.

Additionally, the controller 210 includes a host I/F 211, a DSP 211, an RF AMP 213, a servo 214, and a system controller 215, although not limited thereto.

The host I/F 211 receives a data write command or a data read command from the host 240 and transmits the command to the system controller 215. In particular, the host I/F 211 may, although not necessarily, receive a command that determines the number of zones included in a unit from the host 240. However, it is understood that a configuration of the number of zones included in a unit may be a pre-determined default configuration and recorded in the information storage medium 300 or the recording/reproducing apparatus 200.

When recording the data, the system controller 215 receives the data write command from the host I/F 211, performs initialization for the data recording, and controls the pickup to write data, according to the data write command, on the information storage medium 300.

The system controller 215 divides a user data area 340 of the information storage medium 300 into units, each having one or more zones, and controls a pickup to record data on the zone according to a data recording movement path in the unit determined with reference to the information about the number of rewriting operations performed on each zone.

More specifically, the system controller 215 manages and checks the information about the number of rewriting operations performed on each zone, and, depending on a result of the checking, controls the pickup 220 to record data on the zone when the number of rewriting operations does not exceed a predetermined threshold value, and not to record data on the zone when the number of rewriting operations exceeds a predetermined threshold value.

The system controller 215 determines a first zone and a second zone as a movement path when both the number of rewriting operations for the first zone contained in the first recording layer and the number of rewriting operations for the second zone contained in the second recording layer that corresponds to the first zone, do not exceed the predetermined threshold. Furthermore, the two layers may be in the same zone, as described in FIGS. 8A, 8B, 9A, and 9B, and the system controller 215 may determine the movement path between the two layers in one zone or adjacent zones.

The system controller 215 may, although not necessarily, determine the number of zones on the basis of at least one of a total recording capacity, a recording time, and a finalizing time of the information storage medium 300.

The zone may be an R zone including the first recording layer and the second recording layer corresponding to the first recording layer. Additionally, the system controller 215 may, although not necessarily, be configured with the unit having 3, 4, or 5 R zones, or determines the number of the R zones included in the unit based on the total number of the R zones included in the information storage medium 300.

Additionally, the system controller 215 controls the pickup to record the information about the number of rewriting operations performed on each of the zone on the RMA 320 of the information storage medium 300.

The system controller 215 also controls the pickup to insert the information about the number of rewriting operations performed on each of the zones in an existing RMD field 1100 in the RMA 320 or to be added as a new RMD field 1110.

The system controller 215 divides a user data area 340 of the information storage medium 300 into units each having one or more zones, and controls a pickup to record data on the zone along a data recording movement path in the unit determined with reference to the information about the number of rewriting operations performed on each zone.

The DSP 212 adds additional data (e.g. parity) for error correction on data to be recorded, which may, although not necessarily, be received from the host I/F 211, generates an ECC block (an error correction block) by performing ECC encoding, and then converts the ECC block using a predetermined method. The RF AMP 213 converts the data, which is outputted from the DSP 212, to an RF signal. The pickup records the RF signal outputted from the RF AMP 213 on the information storage medium 300. The servo 214 servo-controls the pickup by inputting a command necessary for servo-control from the system controller 215.

When reproducing, the host I/F 211 may receive a read command from the host 240, the system controller 215 performs initialization to reproduce and controls a pickup to read data according to the read command.

The pickup projects a laser beam on the information storage medium 300, and outputs an optical signal by receiving the reflected laser beam from the information storage medium 300. The RF AMP 213 converts the optical signal outputted from the pickup into the RF signal, provides converted data from the RF signal to the DSP 212, and provides a servo signal for control obtained by the RF signal to the servo 214.

The servo 214 receives the servo signal received from the RF AMP 213 and the command necessary for servo control received from the system controller 215, and performs the servo control for the pickup. The host I/F 211 transmits the data received from the DSP 212 to the host 240.

According to aspects of the present invention, degradation of an information storage medium 300 as a result of rewriting data repeatedly can be prevented using information about the number of rewriting operations performed on each recording area of the information storage medium 300. Thus, user data can be reliably protected. Moreover, a time taken due to unnecessary layer jump, a memory capacity of a recording/reproducing apparatus, and power consumption for only a minimum layer jump may all be reduced.

The invention can also be embodied as computer-readable codes on a computer-readable recording medium. The computer-readable recording medium is any data storage device that can store data which can be thereafter read by a computer system or an apparatus capable of reading and processing data recorded on the recording medium. Examples of the computer-readable recording medium include read-only memory (ROM), random-access memory (RAM), CD-ROMs, magnetic tapes, floppy disks, optical data storage devices, and carrier waves (such as data transmission through the Internet), although not limited thereto. The computer-readable recording medium can also be distributed over network-coupled computer systems so that the computer-readable code is stored and executed in a distributed fashion. Also, functional programs, codes, and code segments to accomplish the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on an information storage medium having a user data area, the method comprising:

selecting a unit in the user data area, wherein the user data area comprises a plurality of units and each unit comprises one or more zones;

determining a data writing path in the selected unit based on an information of a number of rewriting operations performed on each of the zones of the one or more zones; and writing data on the one or more zones along the data writing path in the selected unit.

2. The method as claimed in claim 1, wherein the determining of the data writing path comprises:

managing the information of the number of rewriting operations performed on each of the zones;

checking the information of the number of rewriting operations performed on each of the zones;

determining to write the data on recordable zones of the one or more zones where the number of rewriting operations performed thereon does not exceed a predetermined threshold value; and determining to not write data on non-recordable zones of the one or more zones where the number of rewriting operations performed thereon exceeds the predetermined threshold value.

3. The method as claimed in claim 1, wherein the unit comprises the one or more zones arranged on a first recording layer and a second recording layer of the information storage medium.

4. The method as claimed in claim 3, wherein the determining of the data writing path comprises determining a movement path from a first zone arranged on the first recording layer to a corresponding second zone arranged on the second recording layer when the number of rewriting operations performed on the first zone does not exceed a predetermined threshold and the number of rewriting operations performed on the second zone does not exceed the predetermined threshold.

5. The method as claimed in claim 4, wherein the determining of the data writing path further comprises:

managing the information of the number of rewriting operations performed on each of the one or more zones;

checking the information of the number of rewriting operations performed on each of the one or more zones;

determining to write the data on recordable zones of the one or more zones where the number of rewriting operations performed thereon does not exceed the predetermined threshold value; and determining to not write data on non-recordable zones of the one or more zones where the number of rewriting operations performed thereon exceeds the predetermined threshold value.

6. The method as claimed in claim 1, further comprising: configuring the user data area with a number of the units; and configuring each unit with a number of the zones.

7. The method as claimed in claim 6, wherein the number of the zones is configured on the basis of at least one of a total recording capacity of the information storage medium, a number of movements between layers, a recording time, and a finalizing time of the information storage medium.

8. The method as claimed in claim 6, wherein the one or more zones are R zones and the R zones are arranged on a first recording layer and a corresponding second recording layer of the information storage medium, wherein the number of the zones, which are R zones, in each unit is configured to be approximately one tenth of a total number of the R zones in the information storage medium.

9. The method as claimed in claim 6, wherein the one or more zones are R zones and the R zones are arranged on a first recording layer and a corresponding second recording layer, wherein the number of the zones, which are R zones, is configured to be three, four, or five R zones.

10. The method as claimed in claim 1, further comprising recording the information about the number of rewriting operations performed on each of the zones of the one or more zones on a Recording Management Area (RMA).

11. The method as claimed in claim 10, wherein the recording of the information comprises inserting the number of rewriting operations performed on each of the zones of the one or more zones in an existing recording management data (RMD) field of the RMA or adding the number of rewriting operations performed on each of the zones of the one or more zones as a new RMD field of the RMA.

12. The method as claimed in claim 1, further comprising increasing the number of rewriting operations performed on each of the zones having a first sector recorded on after the writing of the data is completed, wherein the first sector is a sector of the zone where data recording of the zone begins.

13. An apparatus to record data to an information storage medium, the apparatus comprising:

a writing unit to write data to the information storage medium, wherein the information storage medium comprises a plurality of units and each unit comprises one or more zones; and a controller to control the writing unit to record data on the one or more zones along a data recording movement path in a unit determined on the basis of a number of rewriting operations performed on each of the one or more zones.

14. The apparatus as claimed in claim 13, wherein the controller:

manages the number of rewriting operations performed on each of the one or more zones;

checks the number of rewriting operations performed on each of the one or more zones; and controls the writing unit to record data on recordable zones of the one or more zones where the number of rewriting operations performed thereon does not exceed a predetermined threshold value, and controls the writing unit to not record data on the non-recordable zones of the one or more zones where the number of rewriting operations performed thereon exceeds the predetermined threshold value.

15. The apparatus as claimed in claim 13, wherein the unit comprises the one or more zones arranged on a first recording layer and a second recording layer of the information storage medium.

16. The apparatus as claimed in claim 15, wherein the controller determines the data recording movement path from a first zone arranged on the first recording layer to a corresponding second zone arranged on the second recording layer when the number of rewriting operations performed on the first zone does not exceed a predetermined threshold and the number of rewriting operations performed on the second zone does not exceed the predetermined threshold.

17. The apparatus as claimed in claim 16, wherein the controller:

manages the number of rewriting operations performed on each of the one or more zones;

checks the number of rewriting operations performed on each of the one or more zones; and controls the writing unit to record data on recordable zones of the one or more zones where the number of rewriting operations performed thereon does not exceed the predetermined threshold value, and controls the writing unit to not record data on the non-recordable zones of the one or more zones where the number of rewriting operations performed thereon exceeds the predetermined threshold value.

18. The apparatus as claimed in claim 13, wherein the controller configures the information storage medium with a number of the units and configures each unit with a number of the zones.

19. The apparatus as claimed in claim 18, wherein the controller configures the number of the zones comprised in each unit on the basis of at least one of a total recording capacity of the information storage medium, a number of movements between layers, a recording time, and a finalizing time of the information storage medium.

20. The apparatus as claimed in claim 18, wherein the one or more zones are R zones and the R zones are arranged on a first recording layer and a corresponding second recording layer of the information storage medium, wherein the controller configures the number of the zones, which are R zones, in each unit to be approximately one tenth of a total number of the R zones in the information storage medium.

21. The apparatus as claimed in claim 18, wherein the one or more zones are R zones and the R zones are arranged on a first recording layer and a corresponding second recording layer, wherein the controller configures the number of the zones, which are R zones, in each unit to be three, four, or five R zones.

22. The apparatus as claimed in claim 13, wherein the controller controls the writing unit to record the number of rewriting operations performed on each of the zones on an RMA on the information storage medium.

23. The apparatus as claimed in claim 22, wherein the controller controls the writing unit to insert the number of rewriting operations performed on each of the zones in an existing RMD or adding the number of rewriting operations performed on each of the zones as a new RMD field of the RMA.

24. The apparatus as claimed in claim 14, wherein the predetermined threshold value is stored in a memory of the apparatus.

25. An information storage medium comprising:
a first area divided into units each comprising one or more zones; and
a second area on which information about the number of rewriting operations performed on each of the one or more zones is recorded,
wherein a movement path along which data is to be written on the one or more zones is determined within each unit in the first area based on the information about the number of rewriting operations performed on each of the one or more zones recorded on the second area.

26. The information storage medium as claimed in claim 25, wherein the data is
written on recordable zones of the one or more zones along the movement path where the number of rewriting operations performed thereon does not exceed a predetermined threshold value, and the data is not written on non-recordable zones of the one or more zones along the movement path where the number of rewriting operations performed thereon exceeds the predetermined threshold value.

27. The information storage medium as claimed in claim 26, wherein the predetermined threshold value is stored on the information storage medium.

28. The information storage medium as claimed in claim 25, wherein each unit comprises the one or more zones arranged on a first recording layer and a second recording layer of the information storage medium.

29. The information storage medium as claimed in claim 28, wherein the movement path is determined from a first zone arranged on the first recording layer to a corresponding second zone arranged on the second recording layer when the number of rewriting operations performed on the first zone does not exceed a predetermined threshold and the number of rewriting operations performed on the second zone does not exceed the predetermined threshold.

30. The information storage medium as claimed in claim 29, wherein the data is written on recordable zones of the one or more zones along the movement path where the number of rewriting operations performed thereon does not exceed the predetermined threshold value, and the data is not written on non-recordable zones of the one or more zones along the movement path where the number of rewriting operations performed thereon exceeds the predetermined threshold value.

31. The information storage medium as claimed in claim 25, wherein the number of the zones comprised in each unit is determined on the basis of at least one of a total recording capacity of the information storage medium, a number of movements between layers, a recording time, and a finalizing time of the information storage medium.

32. The information storage medium as claimed in claim 25, wherein the one or more zones are R zones and the R zones are arranged on a first recording layer and a corresponding second recording layer of the information storage medium, wherein a number of the R zones comprised in each unit is configured at approximately one tenth of a total number of the R zones in the information storage medium.

33. The information storage medium as claimed in claim 25, wherein the one or more zones are R zones and the R zones are arranged on a first recording layer and a corresponding second recording layer of the information storage medium, wherein a number of the R zones comprised in each unit is configured at three, four, or five R zones.

34. The information storage medium as claimed in claim 25, wherein the second area comprises an RMA of the information storage medium to store the information about the number of rewriting operations performed on each of the one or more zones.

35. The information storage medium as claimed in claim 34, wherein the information about the number of rewriting operations performed on each of the one or more zones is stored in an existing RMD field or stored in a new RMD field of the RMA.

36. A non-tangible computer-readable medium including computer readable code that, when executed by a computer performs the method of recording data on an information storage medium having a user data area, the method comprising:
selecting a unit in the user data area wherein the user data area comprises plurality of units and each unit comprises one or more zones;
determining a data writing path in the selected unit based on a information of a number of rewriting performed on each of the zones of the one or more zones; and
writing data on the one or more zones along the data writing path in the selected unit.

* * * * *